Oct. 18, 1966  I. E. McKINLEY ET AL  3,279,498
DUAL FLUID VALVE

Original Filed June 25, 1962  5 Sheets-Sheet 3

FIG_3_

INVENTORS
IVAN E. McKINLEY
ERICH SCHUSTER
ELMER E. WALLACE

BY Michael J. McDonald
AGENT

Oct. 18, 1966    I. E. McKINLEY ET AL    3,279,498
DUAL FLUID VALVE

Original Filed June 25, 1962    5 Sheets-Sheet 4

INVENTORS
IVAN E. McKINLEY
ERICH SCHUSTER
ELMER E. WALLACE

BY *Michael J McDonald*
AGENT

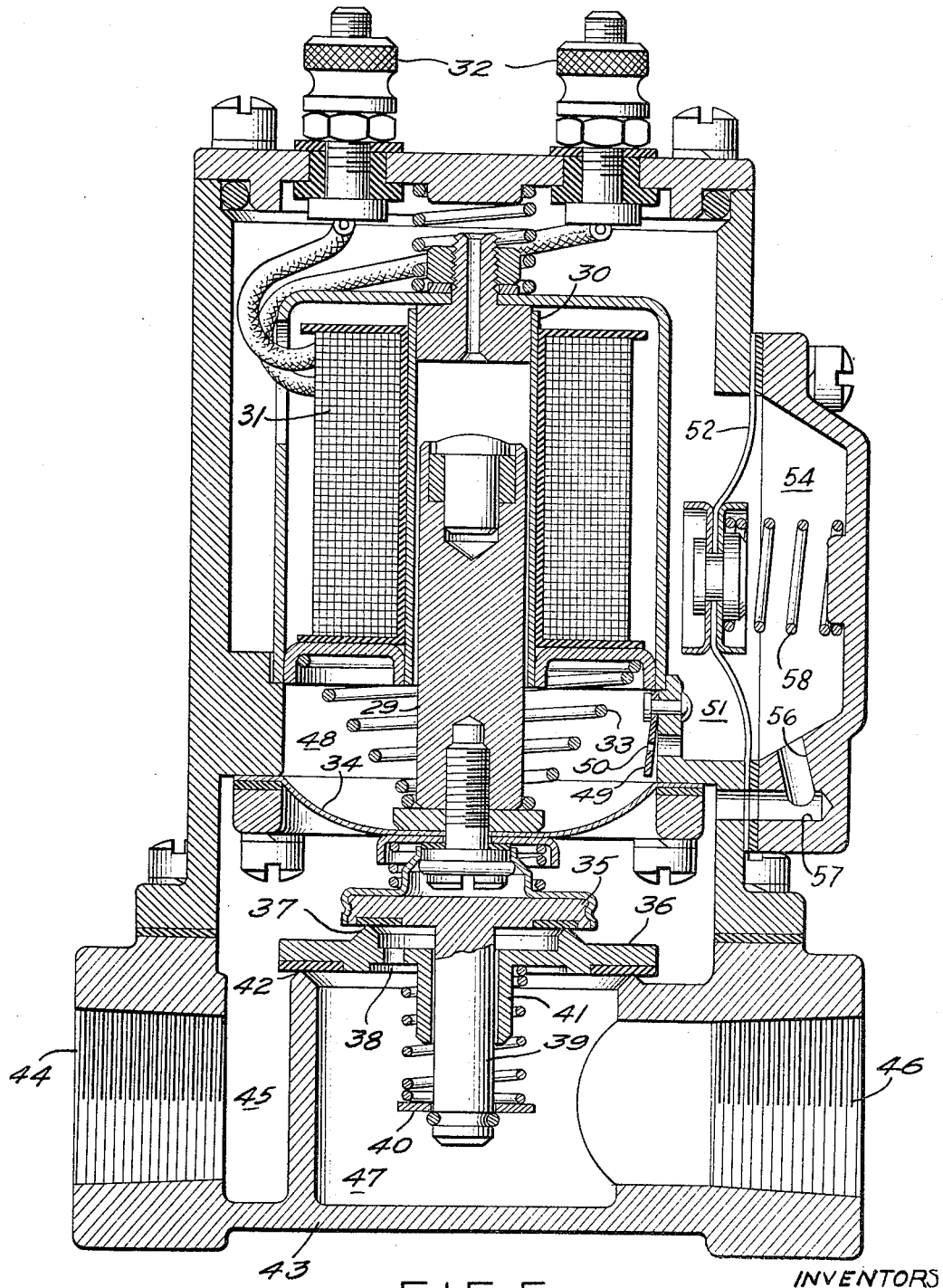
FIG_5_

3,279,498
DUAL FLUID VALVE
Ivan E. McKinley, deceased, late of Riverside, Calif., by Mathea McKinley, executrix, Riverside, Calif., Erich Schuster, Hemet, and Elmer E. Wallace, Fullerton, Calif., assignors to Controls Company of America, Schiller Park, Ill., a corporation of Delaware
Continuation of application Ser. No. 206,133, June 25, 1962. This application June 16, 1965, Ser. No. 469,041
9 Claims. (Cl. 137—630.15)

This is a continuation of our application Serial No. 206,133, filed June 25, 1962, now abandoned, which is in turn a continuation of our application Serial No. 828,184, filed July 20, 1959, now abandoned.

This invention relates to devices for controlling the flow of fluids such as gas fuel.

More particularly this invention relates to a dual valve assembly having two valves for use in controls of various types and which will provide for the two stage supply of gas.

An object of our invention is to provide a foolproof dual valve assembly for use in devices for controlling the flow of gas to burners such as those used in gas heaters.

A further object is to provide a dual valve assembly having primary and secondary valves which will open successively, the secondary valve to supply an initial flow of gas for silent ignition of a burner and the primary valve to provide flow of full gas volume.

In the drawings:

FIG. 5 is a sectional view of another type of control employing our dual valve.

Figure 1:
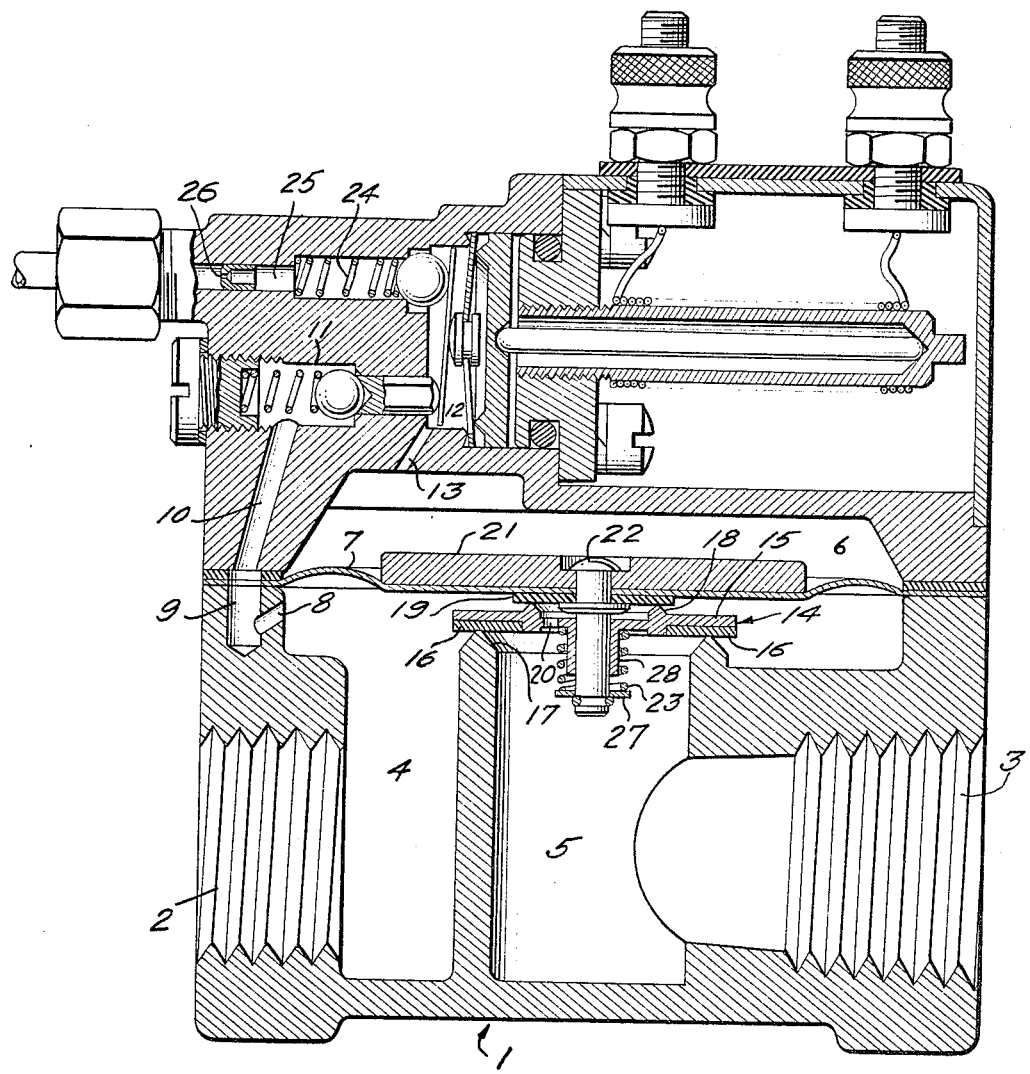
FIG. 1 is a sectional view of a control employing the dual valve and showing the primary and secondary valves closed.

In the drawings the gas flow through the control 1 is from left to right, entering inlet 2 and leaving through outlet 3 which is connected to a gas burner, not shown, to be controlled. In the control shown in FIGS. 1, 2 and 3 there are three chambers 4, 5 and 6 in the control body. By varying the pressures in these chambers diaphragm 7 is employed as a motor or drive to operate the dual valve composed of primary and secondary valves, carried thereby. This dual valve is composed of primary valve assembly 14 provided with a primary valve 15 having a suitable composition face 16 for engagement with primary valve seat 17 to control the primary or second stage flow of gas from chamber 4 to chamber 5.

Assembly 14 is also provided with a secondary valve seat 18 arranged for engagement by a secondary valve 19 to control the secondary or first stage flow of gas from inlet chamber 4 to outlet chamber 5 through one or more ports 20 extending through valve assembly 14 within the area surrounded by secondary valve seat 18. Secondary valve 19, diaphragm 7 and a weight 21 are secured together by pin 22. Primary valve assembly 14 is slidably mounted on the lower portion of the pin and urged into engagement with the secondary valve by means of spring 23.

In operation the gas pressure in chamber 4 remains essentially constant, except for a small pressure drop when gas is flowing to the burner. This pressure, referred to herein as line pressure, is equal to the pressure in the supply line, not shown, connected to the inlet 2.

The pressure in chamber 5 varies from atmospheric when primary and secondary valves are closed to a pressure substantially equal to line pressure of chamber 4 when the primary valve is open. The pressure in chamber 6 also varies between atmospheric and line pressure.

In FIG. 1 primary and secondary valves are closed. Chamber 4 being connected to the line, is at line pressure. Chamber 5 being vented to atmosphere through the burner is at atmospheric pressure. Chamber 6 being vented through ports 8, 9, 10, 12 and 13 is also at line pressure, ball valve means 11 being open. Under these pressure conditions the entire upper area of the diaphragm is subject to line pressure which tends to move it down. The downward force is greater than the upward force exerted by line pressure on the lower side of the diaphragm which is reduced in area by the portion sealed off by seat 17. This difference in these forces plus the force of weight 21 and spring 23 firmly holds both primary and secondary valves closed once they are seated.

Figure 2:
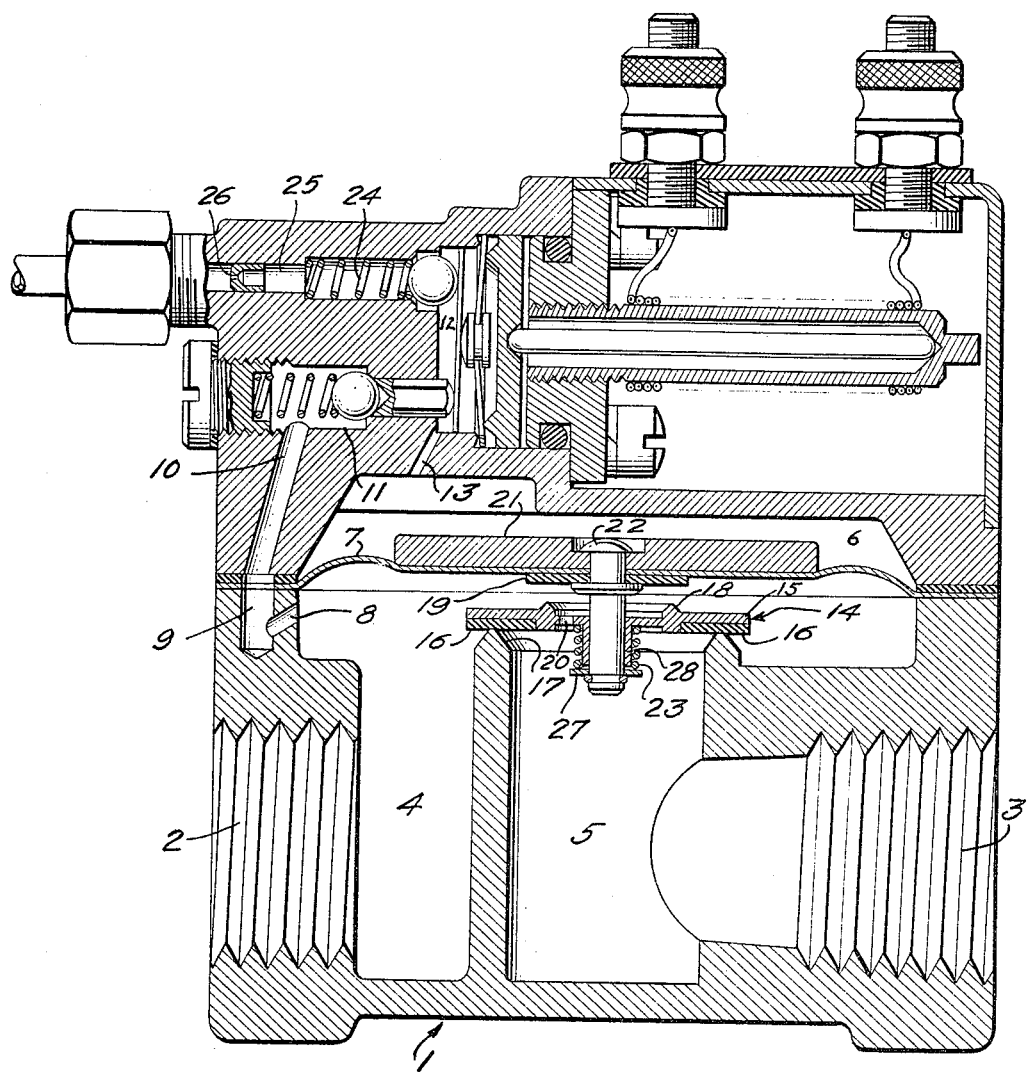
FIG. 2 is a sectional view of the control showing the secondary valve open to provide partial flow of gas.

In FIG. 2, mechanism which does not constitute a part of the invention covered by this application, has functioned to close ball valve means 11 and open ball valve means 24. Under these conditions chamber 6 is no longer ported to line pressure through valve means 11 but is vented to atmosphere through vent 25 and orifice 26. The pressure in chamber 6 consequently drops to atmospheric at a rate dependent upon the size of orifice 26. The structural details of valve means 11 and 24, their actuating mechanism and the operation of both the valve means and actuating mechanism are more completely described in U.S. Patent No. 3,024,811 of Edwin W. McKinley issued March 13, 1962 for "Valve Control Apparatus" and assigned to the assignee of this application and reliance is placed on the disclosure of that patent to complete this disclosure with regard to the valve means and their actuating mechanism.

The upward force on diaphragm 7 exerted by line pressure is, therefore, greater than the downward force exerted by atmospheric pressure on the upper side of the diaphragm. The diaphragm consequently moves upwardly and valve 19, being secured to the diaphragm, moves off secondary seat 18 to open the secondary valve and permit gas flow through ports 20 to the burner through outlet 3.

The number and size of these ports determine the volume of gas initially supplied to the burner through the secondary valve. The required volume depends on the type of gas and the particular burner being supplied. The ideal volume is sufficient to provide good full ignition of the main burner from the pilot light without noise, explosion or blow back commonly encountered when single stage valves are employed.

Under the conditions shown in FIG. 2 primary valve assembly 14 remains in the closed position shown with valve face 16 seated on primary valve seat 17. The volume of gas flowing through ports 20 is relatively small and while the pressure in chamber 5 will increase above atmospheric it will not increase sufficiently to create sufficient force to lift the primary valve against the downward force exerted by normal line pressure on the upper surface of primary valve 15 even with the aid of spring 23. However, in the event line pressure is for any reason abnormally low the downward force exerted by this low line pressure against the upper face of primary valve 15 will be insufficient to overcome upward force of spring 23 and the force exerted by the above atmospheric pressure in chamber 5 acting against the lower face of valve 15. Under these low line pressure conditions the dual valve will function essentially as a single valve. The primary valve 15 opening either simultaneously with the secondary valve 19 or shortly thereafter before washer 27 on pin 22 engages sleeve 28 to directly open the primary valve. The timing of these functions depends on how abnormally low the line pressure is, the strength of spring 23 and the rate at which the secondary valve is moved upwardly off its seat. When line pressure is abnormally low there is a possibility that the volume of gas supplied to the burner will be inadequate for proper ignition. Under these conditions ignition is likely to occur within the mixing chamber rather than at the burner outlet. With our valve this possibility is reduced to a minimum.

Returning again to operation under normal line pressure, as the diaphragm continues to move upwardly washer 27 on pin 22 moves with it and eventually engages sleeve 28 on valve assembly 14 to lift the primary valve 15 off its seat 17 and permit full flow of gas. The greater pressure differential in chambers 4 and 6 acting on greater diaphragm areas compared to lower pressure differential in chambers 4 and 5 acting on the lesser areas of valve 15 provide sufficient force to unseat the primary valve as described.

Figure 3:
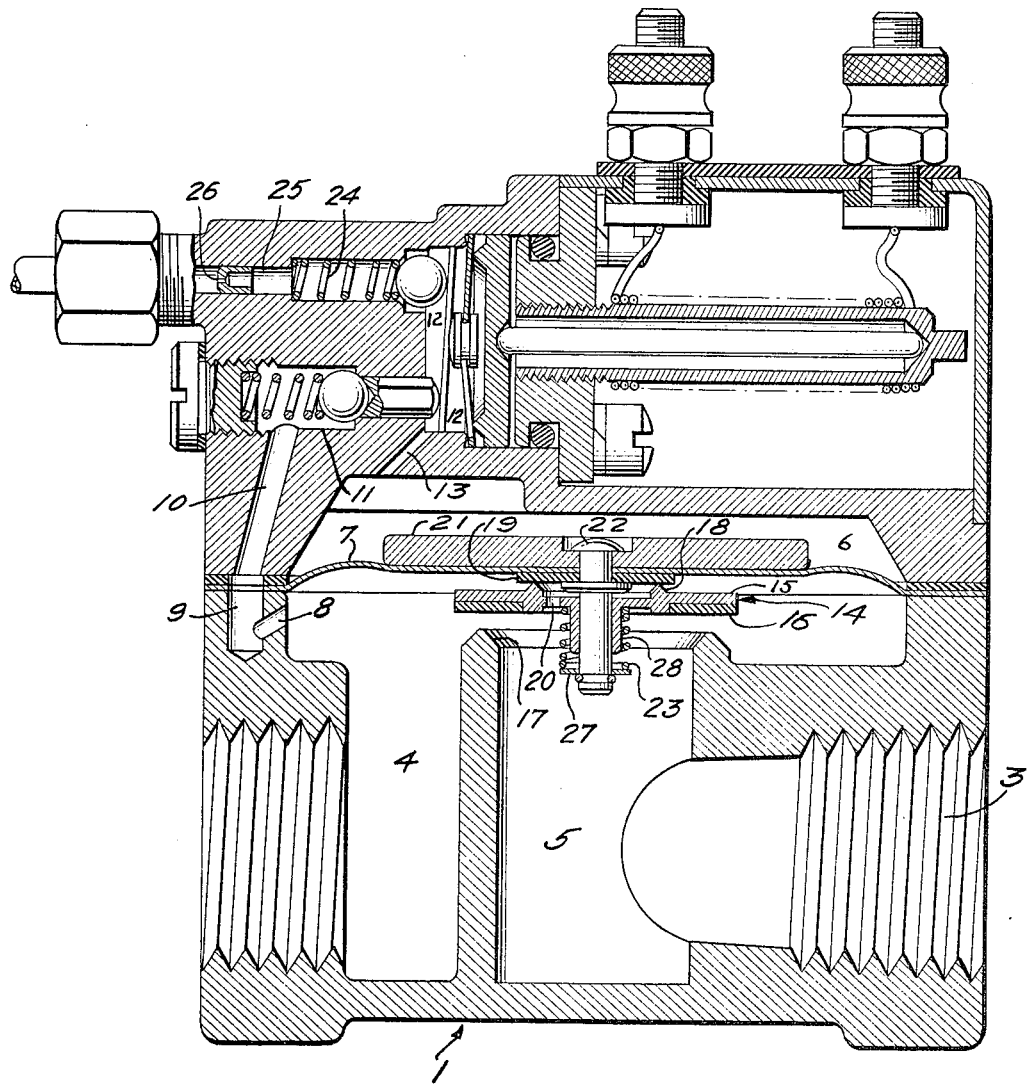
FIG. 3 is a sectional view of the control showing the primary valve open to provide full flow of gas.
Figure 4:
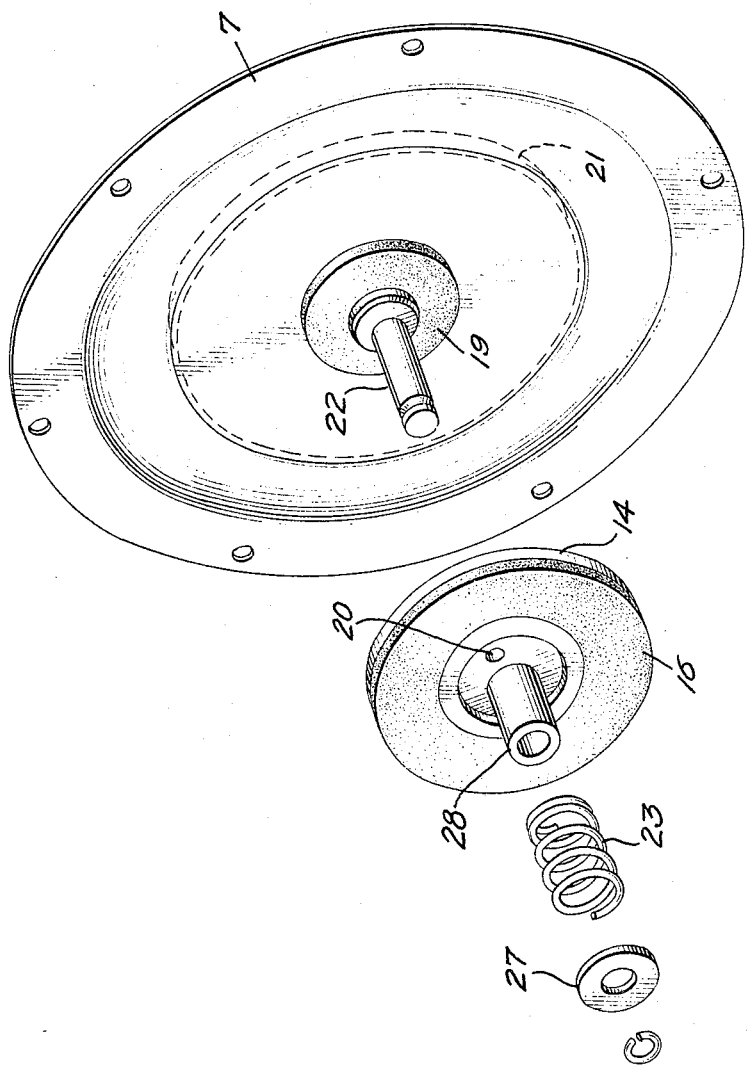
FIG. 4 is an exploded view showing details of the dual valve assembly.

Once the primary valve is unseated spring 23 will snap the secondary valve closed, there being no pressure differential acting on the valve assembly 14 once it is lifted off the primary valve seat. The foregoing condition is shown in FIG. 3.

On opening ball valve means 11 and closing ball valve means 24 chamber 6 is again ported to chamber 4 and as the pressures in these chambers approach an equal value, weight 21 and the weight of the valve assembly will cause the primary valve to seat as shown in FIG. 1. The forces created by the pressure differential resulting from the closing of the primary valve then come into play to firmly hold the primary and secondary valves seated as explained above in connection with FIG. 1.

As described above, the time interval between the opening of the secondary and primary valve is influenced by the line pressure and if this pressure is sufficiently low the time interval will be reduced to zero. This time interval is also influenced by the strength of spring 23, the rate at which the secondary valve is lifted, the ratio of diaphragm area to primary valve are subject to pressure influences, the total area of the port or ports 20 and the back pressure of the burner being controlled. In the modification shown in FIGS. 1 to 3 inclusive the time interval may be most readily changed by changing the rate at which the secondary valve is lifted by diaphragm 7. This may be accomplished by substituting a larger orifice 26 for a shorter time interval or a smaller orifice for a longer interval.

Our dual valve may be used in any type of control provided with a motor or other driving means which will lift the secondary valve off its seat at a relatively slow, and preferably easily variable, rate. In FIGS. 1 to 3 modification the motor or driving means is the diaphragm 7 which functions through the suitable control of pressure differentials to slowly lift the secondary valve and subsequently the primary valves off their seats at a relatively slow rate to provide a suitable time lapse, normally in the order of a few seconds, between the opening of these valves.

FIG. 5 shows another type of motor or drive for successively lifting the valves off their seats in a desired time interval. This motor, which does not constitute a part of the invention covered by this application, is composed of a solenoid 29 slidably mounted in sleeve 30 surrounded by coil 31 and energized by a current source applied to terminals 32. Spring 33 holds the solenoid in the position shown when the coil is not energized. The lower end of the solenoid is connected to our dual valve assembly of essentially the same construction previously disclosed. This assembly is composed of diaphragm 34 and secondary valve 35 both secured to the lower end of solenoid 29 for movement therewith. Primary valve 36 is provided with secondary valve seat 37 within the area of which one or more orifices 38 are provided. The primary valve is slidably mounted on pin 39 forming a part of the secondary valve and is urged toward the latter to resiliently hold the secondary valve on its seat. A washer 40 is mounted on the lower end of the pin in a position to engage sleeve 41 on the primary valve when the secondary valve is lifted. A primary valve seat 42 is formed in the control body 43 which is provided with a gas inlet 44 leading to chamber 45 and an outlet 46 leading from chamber 47. Chamber 48 is formed above diaphragm 34 and is gas tight except for flap valve 49 having a vent 50 to pressure chamber 51.

When the coil is energized the resulting magnetic field will lift the solenoid, diaphragm and secondary valve at a rate depending on the size of orifice 50, the diaphragm acting as a pump to force air through the orifice into pressure chamber 51 as it moves upwardly. As upward movement continues washer 40 will engage sleeve 41 to lift the primary valve off its seat. On deenergizing the coil the solenoid assembly will move rapidly to the position shown in FIG. 5, rapid movement being due to the action of spring 33 and relatively free flow of air through flap valve 49.

Diaphragm 52 separates chamber 51 from chamber 54 which in turn communicates with inlet chamber 45 through ports 56 and 57 so that the pressure in chamber 54 corresponds to inlet pressure. As air, or whatever other suitable media fills chamber 48, is expelled into chamber 51 the increase in the volume of air in chamber 51 is against a force exerted on diaphragm 52 by the inlet pressure and spring 58. Therefore, the increase in volume of air in chamber 51 due to movement of diaphragm 34 to open the valve and, correspondingly, the rate of flow of air through orifice 50 is influenced by the pressure in chamber 54 which is determined by the inlet pressure.

Except for the motor or drive the valve of FIG. 5 operates on the same principle as the valve in the FIGS. 1 to 3 modification. It should be understood that diaphragm 7 of the first modification and diaphragm 34 of the second modification are not essential to the function of the valve per se. These diaphragms are essential to the function of the particular motors shown but other motors not employing such a diaphragm may be used. Any motor which will function to slowly lift the secondary valve through sufficient range to lift both valves at the ends of its stroke will function satisfactorily.

Essentially we provide, in all modifications, a secondarily valved primary valve arranged for serial operation under normal line pressure conditions and for primary operation only under subnormal line pressure.

It is to be understood that the embodiments disclosed herein may be modified within the scope of our invention as set forth in the appended claims.

We claim:
1. A valve having
an inlet and an outlet separated by a valve seat,
a first valve cooperable with the seat to control flow from the inlet to the outlet,
an orifice through the first valve to permit restricted flow from the inlet to the outlet,
a second valve cooperating with the second orifice to control flow therethrough,
a lost motion connection between the first and second valves,
motor means for actuating the second valve upon initial movement thereof and the first valve upon taking up the lost motion in said connection,
spring means connected between and resiliently urging the first and second valves toward each other to shut off flow instantly through said first valve orifice,
said valves being arranged so that the inlet pressure acts in a valve seating direction on each valve, the spring means acting to open the first valve after the second valve has opened in the event the inlet pressure is below a predetermined normal pressure and whereby the first and second valves open practically simultaneously when the inlet pressure falls to an abnormal low pressure,
said motor means includes a solenoid having its armature connected to the second valve, a diaphragm cooperating with the valve body and armature to define a variable volume chamber, and a restricted passage from the chamber for restricting movement of the armature when the solenoid is energized, said restricted passage leading to a chamber on one side of a second diaphragm, the other side of said second diaphragm being exposed to inlet pressure whereby the pressure drop across the restricted passage varies in accordance with inlet pressure.

2. A valve having
an inlet and an outlet separated by a valve seat,
a first valve cooperable with said seat to control flow from the inlet to the outlet,
an orifice through the first valve to permit restricted flow from the inlet to the outlet,
a second valve cooperating with said orifice to control flow therethrough,
said valves arranged so that inlet pressure acts in a valve seating direction on each valve,
means providing a lost motion connection between said first and second valves,
solenoid means including an armature connected to said second valve and operative upon initial armature movement to move said second valve from said orifice and further operative upon taking up said lost motion to move said first valve from said seat,
spring means,
and means operatively connecting said spring means to said first and second valves to exert an effective biasing force urging said first and second valves toward each other and acting on said first valve in a direction to open said first valve after said second valve has opened, the effective force of said spring means corresponding to a predetermined normal inlet pressure and being of sufficient magnitude to move said first and second valves together to close said orifice after said first valve is moved from said seat so that said first and second valves open practically simultaneously when said inlet pressure is below said predetermined normal inlet pressure and said first and second valves open sequentially when said inlet pressure is above said predetermined normal inlet pressure and, furthermore, so that said first and second valves move jointly when said first valve reseats to thereby close said valve and instantly shut off flow therethrough.

3. A valve having
an inlet and an outlet separated by a valve seat,
a first valve cooperable with said seat to control flow from the inlet to the outlet,
an orifice through said first valve to permit restricted flow from the inlet to the outlet,
a second valve cooperating with said orifice to control flow therethrough,
said first valve being arranged so that inlet pressure acts in a valve seating direction on said first valve,
means defining a lost motion connection between said first and second valves,
motor means connected to and operative to move said second valve relative to said first valve and open said orifice upon initial movement of said motor means and further operative to move said first valve from said seat upon taking up the lost motion in said connection,
spring means,
and means operatively connecting said spring means to said first and second valves to exert an effective biasing force urging said first and second valves toward each other and acting in a direction to open said first valve after said second valve has opened, the effective force of said spring means corresponding to a predetermined normal inlet pressure and being of sufficient magnitude to move said first and second valves together to close said orifice after said first valve is opened so that said first and second valves open practically simultaneously when the inlet pressure is below said predetermined normal pressure and said first and second valves open sequentially when said inlet pressure is above said predetermined normal pressure and, furthermore, so that said first and second valves move jointly as said first valve reseats to thereby close said valve and instantly shut off flow therethrough.

4. Apparatus according to claim 3 in which the motor means includes a diaphragm biased in the valve closing direction with a biasing force of sufficient magnitude to prevent operation of the motor means in the valve opening direction when the inlet pressure falls below a dangerously low pressure.

5. Apparatus according to claim 3 in which the motor means includes
a diaphragm having one side exposed to inlet pressure,
means for applying inlet pressure to the other side of said diaphragm for holding the valves closed,
and means for venting said other side of the diaphragm to atmosphere through a restricted flow path for allowing inlet pressure to act on the diaphragm to open the second valve.

6. A valve having
an inlet and an outlet separated by a valve seat,
means defining a chamber in said body,
a first valve for controlling flow past said seat,
a diaphragm mounted in the body with one side exposed to inlet pressure and the other side exposed to pressure in said chamber,
an orifice in said first valve,
a second valve connected to and movable with said diaphragm and cooperating with said orifice to control flow therethrough,
said first valve being arranged so that inlet pressure acts in a valve seating direction on said first valve,
a lost motion connection between said first and second valves with initial movement of said diaphragm moving said second valve to open said orifice and said first valve being moved from said seat upon taking up said lost motion,
spring means,
and means operatively connecting said spring means to said first and second valves to exert an effective biasing force urging said first and second valves toward each other and acting in a direction to open said first valve after said second valve is opened, the effective force of said spring means corresponding to a predetermined normal inlet pressure and being of sufficient magnitude to move said first and second valves together to close said orifice after said first valve is opened so that said first and second valves open practically simultaneously when said inlet pressure is below said predetermined normal inlet pressure and said first and second valves open sequentially when said inlet pressure is above said predetermined normal pressure and, furthermore, so that said first and second valves move jointly as said first valve reseats to thereby close said valve and instantly shut off flow therethrough,
a passage from said inlet to said chamber,
a vent from said chamber to atmosphere,
and valve means for selectively connecting said chamber to said passage and said vent.

7. Apparatus according to claim 6 including means biasing the diaphragm in the direction to close the valve with a force sufficient to preclude valve opening if the inlet pressure is below a predetermined minimum.

8. A valve having
an inlet and an outlet with a valve seat therebetween,
a diaphragm mounted in the body to define a variable volume chamber on one side of the diaphragm,
a first valve,
a second valve carried by the diaphragm,
means defining a lost motion connection between said first and second valves, said first valve cooperating with said seat to control flow from the inlet to the outlet and having an orifice therein to allow restricted flow, said second valve cooperating with said orifice to control flow therethrough, means for moving the second valve to open the orifice and to also open the first valve upon taking up the lost motion in said connection, spring means, and means connecting said spring means to act between said first and second valves with an effective biasing force acting in a direction to open said first valve after said second valve is open and to seat the second valve to close said orifice, said effective force corresponding to a predetermined normal pressure acting to seat said first valve and being of sufficient magnitude to move said first and second valves together after said first valve is opened so that said first and second valves open practically simultaneously when the pressure acting to seat said first valve is below said predetermined pressure and open sequentially when said pressure acting to seat said second valve is above said predetermined pressure and, furthermore, move jointly as said first valve reseats to thereby close said valve and instantly shut off flow therethrough, the volume of said chamber decreasing as the valves open, an opening from the chamber, and means restricting said opening during valve movement to retard such movement and provide for sequential opening of the valves.

9. Apparatus according to claim 8 in which said first valve is arranged to open against inlet pressure and whereby the sequencing of the valves is affected by variations in inlet pressure and the valves can open simultaneously if the inlet pressure is abnormally low.

References Cited by the Examiner

UNITED STATES PATENTS

| | | | |
|---|---|---|---|
| 814,285 | 3/1906 | Gold | 137—630.15 X |
| 1,298,849 | 4/1919 | Wolff | 137—630.15 |
| 2,235,304 | 3/1941 | Toussaint | 251—45 |
| 2,263,819 | 11/1941 | Ray | 251—141 X |
| 2,508,064 | 5/1950 | Hazard | 137—630.19 X |
| 2,588,137 | 3/1952 | Marvin | 251—141 X |
| 3,024,811 | 3/1962 | McKinley | 251—11 X |

FOREIGN PATENTS

| | | |
|---|---|---|
| 1,119,712 | 4/1956 | France. |
| 557,746 | 2/1957 | Italy. |

WILLIAM F. O'DEA, *Primary Examiner.*

ISADOR WEIL, *Examiner.*

J. O'NEILL, C. GORDON, *Assistant Examiners.*